(12) United States Patent
Hsu et al.

(10) Patent No.: US 7,454,500 B1
(45) Date of Patent: Nov. 18, 2008

(54) GLOBAL SERVER LOAD BALANCING

(75) Inventors: Ivy Pei-Shan Hsu, Danville, CA (US); David Chun Ying Cheung, San Jose, CA (US); Rajkumar Ramniranjan Jalan, Fremont, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 383 days.

(21) Appl. No.: 09/670,487

(22) Filed: Sep. 26, 2000

(51) Int. Cl.
*G06F 15/173* (2006.01)
(52) U.S. Cl. ........................... 709/226; 709/203
(58) Field of Classification Search ............... 709/226, 709/245, 105, 201, 227, 228, 223–224, 238, 709/203, 217, 219, 225, 241; 707/10; 370/389, 370/400, 401
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,948,061 A | 9/1999 | Merriman et al. | |
| 5,951,634 A | 9/1999 | Sitbon et al. | |
| 6,006,269 A | 12/1999 | Phaal | |
| 6,006,333 A | 12/1999 | Nielsen | |
| 6,092,178 A * | 7/2000 | Jindal et al. | 712/27 |
| 6,112,239 A * | 8/2000 | Kenner et al. | 709/224 |
| 6,115,752 A * | 9/2000 | Chauhan | 709/241 |
| 6,128,279 A * | 10/2000 | O'Neil et al. | 370/229 |
| 6,128,642 A | 10/2000 | Doraswamy et al. | |
| 6,148,410 A | 11/2000 | Baskey et al. | |
| 6,167,445 A | 12/2000 | Gai et al. | |
| 6,167,446 A | 12/2000 | Lister et al. | |

(Continued)

OTHER PUBLICATIONS

International Business Machines Corporation, "SecureWay Network Dispatcher User's Guide, Version 2.1 for AIX, Solaris and Windows NT", Third Edition, Mar. 1999, Chapter 3 "Introducing IBM's SecureWay Network Dispatcher" (pp. 15-28), Chapter 4 "Planning for the Dispatcher Component" (pp. 29-36), Chapter 9 "Planning for Interactive Session Support Component" (pp. 85-94), Chapter 10 "Configuring the Interactive Session Support Component" (pp. 95-108), Chapter 11 "Operating and Managing SecureWay Network Dispatcher" (pp. 109-120), Appendix C "Command Reference for ISS" (pp. 163-176), Appendix E "Sample Configuration Files" (pp. 179-196), downloaded from the Internet at http://www-3.ibm.com/software/webservers/edgeserver/library.html.

(Continued)

*Primary Examiner*—Salad Abdullahi
(74) *Attorney, Agent, or Firm*—Townsend and Townsend and Crew LLP (57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

29 Claims, 3 Drawing Sheets

U.S. PATENT DOCUMENTS

| | | | | |
|---|---|---|---|---|
| 6,182,139 | B1* | 1/2001 | Brendel | 709/226 |
| 6,195,691 | B1* | 2/2001 | Brown | 709/219 |
| 6,233,604 | B1 | 5/2001 | Van Horne et al. | |
| 6,286,039 | B1 | 9/2001 | Van Horne et al. | |
| 6,286,047 | B1 | 9/2001 | Ramanathan et al. | |
| 6,304,913 | B1 | 10/2001 | Rune | |
| 6,324,580 | B1 | 11/2001 | Jindal et al. | |
| 6,327,622 | B1 | 12/2001 | Jindal et al. | |
| 6,336,137 | B1 | 1/2002 | Lee et al. | |
| 6,381,627 | B1* | 4/2002 | Kwan et al. | 709/201 |
| 6,389,462 | B1* | 5/2002 | Cohen et al. | 709/218 |
| 6,427,170 | B1* | 7/2002 | Sitaraman et al. | 709/226 |
| 6,434,118 | B1 | 8/2002 | Kirschenbaum | |
| 6,438,652 | B1* | 8/2002 | Jordan et al. | 711/120 |
| 6,446,121 | B1* | 9/2002 | Shah et al. | 709/224 |
| 6,449,657 | B2* | 9/2002 | Stanbach et al. | 709/245 |
| 6,470,389 | B1* | 10/2002 | Chung et al. | 709/227 |
| 6,473,802 | B2 | 10/2002 | Masters | |
| 6,480,508 | B1* | 11/2002 | Mwikalo et al. | 370/475 |
| 6,490,624 | B1 | 12/2002 | Sampson et al. | |
| 6,549,944 | B1 | 4/2003 | Weinberg et al. | |
| 6,578,066 | B1* | 6/2003 | Logan et al. | 709/105 |
| 6,606,643 | B1* | 8/2003 | Emens et al. | 709/203 |
| 6,665,702 | B1 | 12/2003 | Zisapel et al. | |
| 6,681,232 | B1 | 1/2004 | Sistanizadeh et al. | |
| 6,681,323 | B1 | 1/2004 | Fontanesi et al. | |
| 6,691,165 | B1 | 2/2004 | Bruck et al. | |
| 6,745,241 | B1 | 6/2004 | French et al. | |
| 6,772,211 | B2 | 8/2004 | Lu et al. | |
| 6,779,017 | B1 | 8/2004 | Lamberton et al. | |
| 6,789,125 | B1 | 9/2004 | Aviani et al. | |
| 6,826,198 | B2 | 11/2004 | Turina et al. | |
| 6,839,700 | B2 | 1/2005 | Doyle et al. | |
| 6,850,984 | B1* | 2/2005 | Kalkunte et al. | 709/229 |
| 6,874,152 | B2 | 3/2005 | Vermeire et al. | |
| 6,879,995 | B1* | 4/2005 | Chinta et al. | 709/204 |
| 6,898,633 | B1 | 5/2005 | Lyndersay et al. | |
| 6,901,081 | B1 | 5/2005 | Ludwig | |
| 6,928,485 | B1 | 8/2005 | Krishnamurthy et al. | |
| 6,963,914 | B1 | 11/2005 | Breibart et al. | |
| 6,963,917 | B1 | 11/2005 | Callis et al. | |
| 6,985,956 | B2 | 1/2006 | Luke et al. | |
| 6,987,763 | B2* | 1/2006 | Rochberger et al. | 370/389 |
| 6,996,615 | B1 | 2/2006 | McGuire | |
| 6,996,616 | B1 | 2/2006 | Leighton et al. | |
| 7,000,007 | B1 | 2/2006 | Valenti | |
| 7,020,698 | B2* | 3/2006 | Andrews et al. | 709/223 |
| 7,020,714 | B2 | 3/2006 | Kalyanaraman et al. | |
| 7,028,083 | B2 | 4/2006 | Levine et al. | |
| 7,032,010 | B1* | 4/2006 | Swildens et al. | 709/219 |
| 7,036,039 | B2 | 4/2006 | Holland | |
| 7,058,717 | B2 | 6/2006 | Chao et al. | |
| 7,062,642 | B1 | 6/2006 | Langrind et al. | |
| 7,086,061 | B1 | 8/2006 | Joshi et al. | |
| 7,089,293 | B2 | 8/2006 | Grosner et al. | |
| 7,127,713 | B2 | 10/2006 | Davis et al. | |
| 7,136,932 | B1 | 11/2006 | Schneider | |
| 7,139,242 | B2 | 11/2006 | Bays | |
| 7,177,933 | B2 | 2/2007 | Foth | |
| 7,185,052 | B2 | 2/2007 | Day | |
| 7,197,547 | B2 | 3/2007 | Miller et al. | |
| 7,206,806 | B2 | 4/2007 | Pineau | |
| 7,225,272 | B2 | 5/2007 | Kelley et al. | |
| 7,240,015 | B1 | 7/2007 | Karmouch et al. | |
| 7,240,100 | B1 | 7/2007 | Wein et al. | |
| 7,254,626 | B1 | 8/2007 | Kommula et al. | |
| 7,257,642 | B1 | 8/2007 | Bridger et al. | |
| 7,260,645 | B2 | 8/2007 | Bays | |
| 7,277,954 | B1 | 10/2007 | Stewart et al. | |
| 7,296,088 | B1 | 11/2007 | Padmanabhan et al. | |
| 7,321,926 | B1 | 1/2008 | Zhang et al. | |
| 2001/0049741 | A1* | 12/2001 | Skene et al. | 709/232 |
| 2001/0052016 | A1 | 12/2001 | Skene et al. | |
| 2002/0026551 | A1 | 2/2002 | Kamimaki et al. | |
| 2002/0038360 | A1* | 3/2002 | Andrews et al. | 709/223 |
| 2002/0055939 | A1 | 5/2002 | Nardone et al. | |
| 2002/0059170 | A1* | 5/2002 | Vange | 707/1 |
| 2002/0059464 | A1 | 5/2002 | Hata et al. | |
| 2002/0062372 | A1 | 5/2002 | Hong et al. | |
| 2002/0078233 | A1 | 6/2002 | Biliris et al. | |
| 2002/0091840 | A1 | 7/2002 | Pulier et al. | |
| 2002/0112036 | A1 | 8/2002 | Bohannon et al. | |
| 2002/0120743 | A1 | 8/2002 | Shabtay et al. | |
| 2002/0124096 | A1 | 9/2002 | Loguinov et al. | |
| 2002/0133601 | A1 | 9/2002 | Kennamer et al. | |
| 2002/0150048 | A1 | 10/2002 | Ha et al. | |
| 2002/0154600 | A1 | 10/2002 | Ido et al. | |
| 2002/0188862 | A1 | 12/2002 | Trethewey et al. | |
| 2002/0194324 | A1 | 12/2002 | Guha | |
| 2002/0194335 | A1 | 12/2002 | Maynard | |
| 2003/0018796 | A1 | 1/2003 | Chou et al. | |
| 2003/0031185 | A1 | 2/2003 | Kikuchi et al. | |
| 2003/0035430 | A1 | 2/2003 | Islam et al. | |
| 2003/0065711 | A1 | 4/2003 | Acharya et al. | |
| 2003/0065763 | A1* | 4/2003 | Swildens et al. | 709/224 |
| 2003/0105797 | A1 | 6/2003 | Dolev et al. | |
| 2003/0115283 | A1 | 6/2003 | Babir et al. | |
| 2003/0135509 | A1 | 7/2003 | Davis et al. | |
| 2003/0210686 | A1 | 11/2003 | Terrell et al. | |
| 2003/0210694 | A1 | 11/2003 | Jayaraman et al. | |
| 2003/0229697 | A1 | 12/2003 | Borella | |
| 2004/0019680 | A1 | 1/2004 | Chao et al. | |
| 2004/0024872 | A1 | 2/2004 | Kelley et al. | |
| 2004/0064577 | A1 | 4/2004 | Dahlin et al. | |
| 2004/0194102 | A1 | 9/2004 | Neerdaels | |
| 2004/0249939 | A1 | 12/2004 | Amini et al. | |
| 2004/0249971 | A1 | 12/2004 | Klinker | |
| 2005/0021883 | A1 | 1/2005 | Shishizuka et al. | |
| 2005/0033858 | A1 | 2/2005 | Swildens et al. | |
| 2005/0086295 | A1 | 4/2005 | Cunningham et al. | |
| 2005/0149531 | A1 | 7/2005 | Srivastava | |
| 2005/0169180 | A1 | 8/2005 | Ludwig | |
| 2005/0286416 | A1 | 12/2005 | Shimonishi et al. | |
| 2006/0036743 | A1 | 2/2006 | Deng et al. | |

OTHER PUBLICATIONS

International Business Machines Corporation, "IBM WebSphere Performance Pack: Load Balancing with IBM SecureWay Network Dispatcher", Oct. 1999, First Edition, Chapter 1, "IBM WebSphere Performance Pack Concepts" (pp. 3-26), Chapter 2, "IBM SecureWay Network Dispatcher Concepts" (pp. 27-54), Chapter 4, "ND Basic Scenarios" (pp. 81-162), Chapter 8, "Wide Area Network Dispatcher Support", (pp. 211-242), downloaded from the Internet at http://www-3.ibm.com/software/webservers/edgeserver/library.html.

Alteon WebSystems Inc., "Alteon WebSystems Introduces New Layer 4+ Switching Technology That Speeds User Access to Internet Servers", pp. 1-4, Dec. 7, 1998, downloaded from the Internet at http://web.archive.org/web/20000919190409/www.alteonwebsystems.com/press/releases/1998/20798.asp.

Alteon WebSystems, Inc., "Enhancing Web User Experience With Global Server Load Balancing", White Paper, Title Page and pp. 1-7, Jun. 1999, downloaded from the Internet at http://www.alteon.com.

Krapf, Eric, Business Communications Review, "Alteon's Global Server Load Balancing", downloaded from the Internet, pp. 60 et sequiter in the original magazine, Jan. 1999, downloaded from the Internet at http://www.bcr.com/bcrmag/1999/01/p60.asp.

Yerxa, Gregory, Network Computing Magazine, "ACElerate on Fast Track for Load-Balancing", pp. 1-4, Mar. 8, 1999, downloaded from the Internet at http://www.networkcomputing.com/1005/1005sp2.html.

Norton Networks, "Alteon Personal Content Director," © 2001, can be retrieved from http://www.nortelnetworks.com/personalinternet, 4 pages.

AlteonWebSystems, "PCT White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

U.S. Appl. No. 11/741,480 (continuation of the present application), filed Apr. 27, 2007, Hsu et al.

U.S. Appl. No. 11/707,697 (which is a continuation of U.S. Patent No. 7,254,626), filed Feb. 16, 2007, Kommula et al.

U.S. Appl. No. 11/429,177 (Continuation of U.S. Patent 7,086,061 cited above), filed May 5, 2006, Joshi et al.

Genova, Z., et al., "Challenges to URL Switching for Implementing Globally Distributed Web Sites," Department of Computer Science and Engineering, University of South Florida, pp. 1-9, Aug. 11, 2000 (PowerPoint Presentation).

U.S. Appl. No. 11/741,480, filed Apr. 27, 2007, Hsu et al.

Office Action dated Nov. 27, 2007, issued in U.S. Appl. No. 11/741,480 (12 pages).

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002 (19 Pages).

"Configuring the CSS Domain Name Service," Dec. 2000, Cisco Systems Inc., downloaded from http://www.ciscosystems.com (13 pages).

Doeringer et al., "Routing on Longest-Matching Prefixes," IEEE/ACM Transactions on Networking, vol. 4, No. 1, Feb. 1996 (12 pages).

Office Action dated Nov. 27, 2007 received in continuation U.S. Appl. No. 11/741,480, filed Apr. 27, 2007 (11 pages).

Office Action dated Apr. 29, 2008 received in continuation U.S. Appl. No. 11/741,480, filed Apr. 27, 2007 (10 pages).

Albitz, P., etal., "DNS and BIND in a Nutshell," O'Reilly & Associates, Sebastopol, CA, 1992, pp. 214-215.

Office Action dated Jan. 12, 2006 received in related U.S. Appl. No. 10/305,823, filed Nov. 27, 2002, 16 pages.

Office Action dated Mar. 9, 2006 received in related U.S. Appl. No. 10/206,580, filed Jul. 25, 2002, 12 pages.

U.S. Appl. No. 10/206,580, filed Jul. 25, 2002, entitled "Global Server Load Balancing."

U.S. Appl. No. 10/305,823, filed Nov. 27, 2002, entitled "Distributed Health Check for Global Server Load Balancing."

U.S. Appl. No. 10/376,903, filed Feb. 28, 2003, entitled "Global Server Load Balancing."

U.S. Appl. No. 10/211,822, filed Aug. 1, 2002, entitled "Statistical Tracking for Global Server Load Balancing."

U.S. Appl. No. 10/377,364, filed Feb. 28, 2003, entitled "Method and System to Clear Counters Used for Statistical Tracking for Global Server Load Balancing."

U.S. Appl. No. 10/214,921, filed Aug. 7, 2002, entitled "Canonical Name (Cname) Handling for Global Server Load Balancing."

U.S. Appl. No. 10/674,627, filed Sep. 29, 2003, entitled "Global Server Load Balancing Support for Private VIP Addresses."

U.S. Appl. No. 10/839,919, filed May 6, 2004, entitled "Host-Level Policies for Global Server Load Balancing."

U.S. Appl. No. 10/840,496, filed May 6, 2004, entitled "Configurable Geographic Prefixes for Global Server Load Balancing."

U.S. Appl. No. 10/924,552, filed Aug. 23, 2004, entitled "Smoothing Algorithm for Round Trip Time (RTT) Measurements."

Bestavros, Azer, "WWW Traffic Reduction and Load Balancing Through Server-Based Caching," IEEE Concurrency, Jan.-Mar. 1997, pp. 56-67.

Paul, Arindam et al., "Balancing Web Server Load for Adaptable Video Distribution," IEEE, 2000, pp. 469-476.

\* cited by examiner

GLOBAL SERVER LOAD BALANCING

BACKGROUND OF THE INVENTION

1. Field of the Invention

The present invention relates to load balancing among servers. More particularly, the present invention relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (i.e. foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from. Japan could receive better response time from a host server in. Japan than from a host server in. New York. Further, the conventional DNS algorithm allows invalid IP addresses (e.g., that corresponding to a downed server) to persist in a local DNS server until the TTL for the invalid IP address expires.

SUMMARY OF THE INVENTION

The present invention provides an improved method and system for serving IP addresses to a client, based on a selected set of performance metrics. In accordance with this invention, a global server load-balancing (GSLB) switch is provided as a proxy for an authoritative DNS server, together with one or more site switches each associated with one or more host servers. Both the GSLB switch and the site switch can be implemented using the same type of switch hardware. Each site switch provides the GSLB switch with current site-specific information regarding the host servers associated with the site switch. Under the present invention, when an authoritative DNS server resolves a host name in a query and returns one or more IP addresses, the GSLB switch filters the IP addresses using the performance metrics compiled from the site-specific information collected from the site switches. The GSLB switch then returns a ranked or weighted list of IP addresses to the inquirer. In one embodiment, the IP address that is estimated to provide the best expected performance for the client is placed at the top of the list. Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metrics is the site switch's "flashback" speed (i.e., how quickly a switch receives a health check result). The ordered list can also be governed by other policies, such as the least selected host server.

The present invention is better understood upon consideration of the detailed description of the preferred embodiments below, in conjunction with the accompanying drawings.

DETAILED DESCRIPTION OF THE PREFERRED EMBODIMENTS

Figure 1:
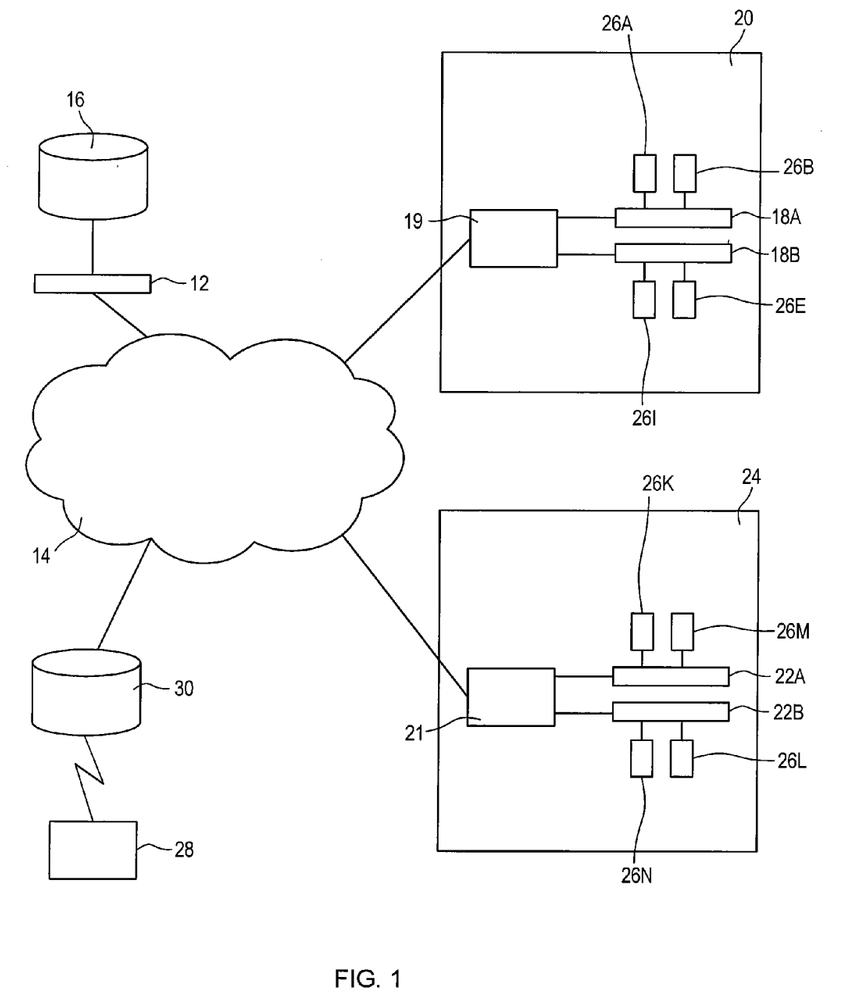
FIG. 1 illustrates a global server load balancing configuration.

FIG. 1 illustrates one embodiment of the present invention that provides a global server load balancing configuration. As shown in FIG. 1, global server load balancing (GSLB) switch 12 is connected to Internet 14 and acts as a proxy to an authoritative. Domain. Name. System (DNS) server 16 for the domain "foundrynet.com" (for example). That is, while the actual DNS service is provided by DNS server 16, the IP address known to the rest of the Internet for the authoritative DNS sever of the domain "foundrynet.com" is a virtual IP address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from. Foundry. Networks Inc.

FIG. 1 also shows client program 28 connected to Internet 14, and communicates with local DNS server 30. When a browser on client 28 requests a web page, for example, using a. Universal. Resource. Locator (URL), such as http://www-.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses are ordered by GSLB switch 12 based on performance metrics described in further detail below. In the remainder of this detailed description, for the purpose of illustrating the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client 28 and returns the IP address list with a virtual IP address configured at that site switch placed at the top. (Within the scope of the present invention, other forms of ranking or weighting the IP addresses in the list can also be possible.). Client program 28 can receive the ordered list of IP addresses, and typically selects the first IP address on the list to access the corresponding host server.

Figure 3:
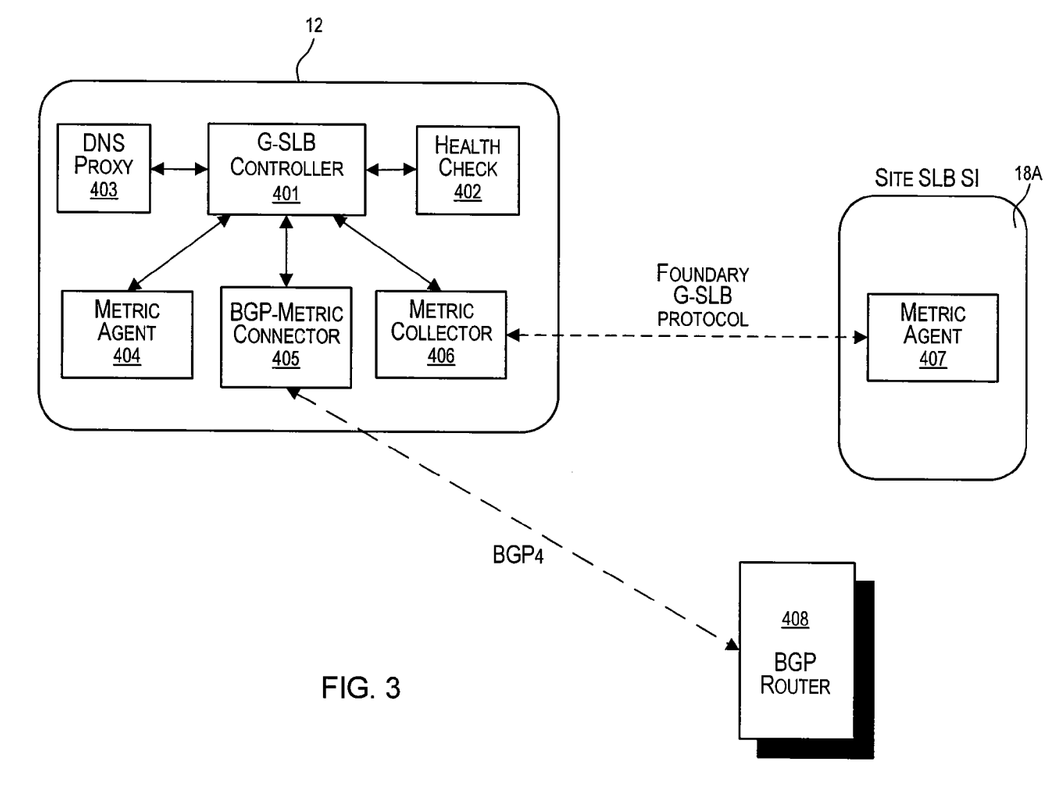
FIG. 3 is a block diagram showing the functional modules of GSLB switch 12 and site switch 18a relevant to the global server load balancing function.

FIG. 3 is a block diagram showing the functional modules of GSLB switch 12 and site switch 18a relevant to the global server load balancing function. As shown in FIG. 3, GSLB 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (i.e., whether or not it is available) of each host server and each relevant application. Site-specific metric collector 406 communicates with metric agents in site-specific switches (e.g., FIG. 3 shows site-specific metric collector 406 communicating with site-specific metric agent 407) to collect site-specific metrics (e.g., number of available sessions on a specific host server). Similarly, routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to the present invention, using the metrics collected by routing-metric collector 405 and site specific collector 406, and values of any other relevant parameter, and (e) provides the ordered list of IP addresses to the requesting DNS server. Since GSLB switch 12 can also act as a site switch, GSLB switch 12 is provided site-specific metric agent 404 for collecting metrics for a site-specific metric collector.

In one embodiment, the metrics used in a GSLB switch includes (a) the health of each host server and selected applications, (b) each site switch's session capacity threshold, (c) the round trip time (RTT) between a site switch and a client in a previous access, (d) the geographical location of a host server, (e) the current available session capacity in each site switch, (f) the "flashback" speed between each site switch and the GSLB switch (i.e., how quickly each site switch responds to a health check from the GSLB switch), and (g) a policy called the "Least. Response selection" (LRS) which prefers the site least selected previously. Many of these performance metrics can be provided default values. Each individual metric can be used in any order and each metric can be disabled. In one embodiment, the LRS metric is always enabled.

Figure 2:
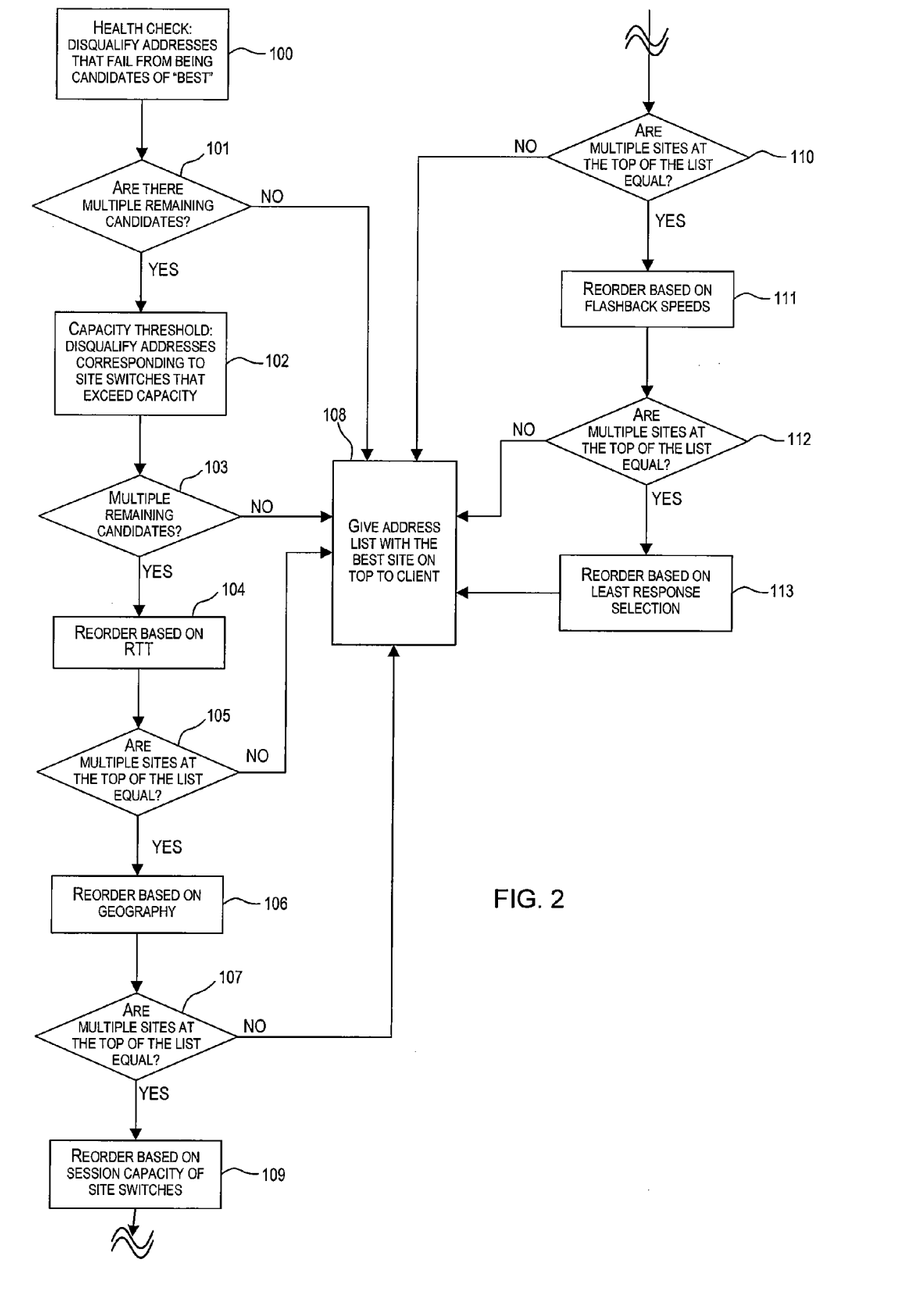
FIG. 2 illustrates in a flow chart one embodiment of the algorithm for selecting the "best" address from the list of addresses supplied by the authoritative DNS.

FIG. 2 illustrates in a flow diagram one embodiment of an optimization algorithm utilized by GSLB switch 12 to process the IP address list received from DNS server 16, in response to a query resulting from client program 28. As shown in FIG. 2, in act 100, upon receiving the IP address list from DNS server 16, GSLB switch 12 performs, for each IP address on the IP address list (e.g., host server 26I connected to site switch 18B), a layer 4 health check and a layer 7 check. Here, layers 4 and 7 refer respectively to the transport and application protocols in the Open. System. Interconnection (OSI) protocol layers. The layer 4 health check can be a. Transmission. Control. Protocol (TCP) health check or a. User. Datagram. Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP. ACK packet is received back from the target. In this embodiment, the layer 7 health check is provided for specified applications, such as the well-known. HyperText. Transport. Protocol (HTTP) and the File. Transfer. Protocol (FTP) applications. If a host server or an associated application fails any of the health checks it is disqualified (act 102) from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses consists of only one IP address (act 101), the list of IP addresses is returned to client program 28 at act 108.

After act 100, if the list of candidate IP addresses for the best site consists of multiple IP addresses, it is further assessed in act 102 based upon the capacity threshold of the site switch serving that IP address. Each site switch may have a different maximum number of TCP sessions it can serve. For example, the default number for the "ServerIron" product of. Foundry. Network is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.). After act 102, if the list of IP addresses consists of only one IP address (act 103), the list of IP addresses is returned to client program 28 at list 108.

After act 102, if the IP address list consists of multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN. ACK packet, to indicate acceptance of a TCP connection; the client machine returns a TCP ACK packet to complete the setting up of the TCP connection.). The GSLB. Switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%. To prevent bias, the GSLB) switch ignores, by default, RTT values for 5% of client queries from each responding network. After act 105, if the top entries on the list of IP addresses do not have equal RTTs, the list of IP addresses is returned to client program 28 at act 108.

If multiple sites have equal RTTs then the list is reordered in act 106 based upon the location (geography) of the host server. The geographic location of a server is determined according to whether the IP address is a real address or a virtual IP address ("VIP"). For a real IP address the geographical region for the host server can be determined from the IP address itself. Under IANA, regional registries RIPE (Europe), APNIC (Asia/Pacific. Rim) and ARIN (the Americas and. Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB. Switch prefers an IP address that is in the same geographical region as the client machine. At act 107, if the top two entries on the IP list are not equally ranked, the IP list is sent to the client program 28 at act 108.

After act 106, if multiple sites are of equal rank for the best site, the IP addresses can then be reordered based upon available session capacity (act 109). For example, if switch 18 A has 1,000,000 sessions available and switch 22B has 800,000 sessions available, switch 18A is then be preferred, if a tolerance limit, representing the difference in sessions available expressed as a percentage of capacity in the larger switch, is exceeded. For example, if the tolerance limit is 10%, switch 18. A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity does not resolve the best IP address, act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client's program uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure. The present invention does not prevent a site switch from performing load balancing among host servers within its subnetwork by redirection using a similar mechanism.

To provide an RTT under the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host sever specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of a dress.). The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

While particular embodiments of the present invention have been shown and described it will be apparent to those skilled in the art that changes and modifications may be made without departing from this invention in its broader aspect and, therefore, the appended claims are to encompass within their scope all such changes and modifications.

We claim:

1. A method of load balancing among host servers of a data network, the method comprising;

storing, in a load balancing switch of the data network, round trip time data for a plurality of host server site switches, wherein the round trip time data for a host server site switch from the plurality of host server site switches indicates a time for exchanging at least one message between the host server site switch and a first client machine of the data network, wherein each host server site switch from the plurality of host server site switches is associated with one or more host servers of the data network, the one or more host servers associated with a host server site switch being reachable via the host server site switch; and ordering, in the load balancing switch, a plurality of network addresses, the plurality of network addresses being responsive to a query regarding a host name, the plurality of network addresses determined from resolution of the host name, the plurality of network addresses comprising network addresses of multiple host server site switches from the plurality of host server site switches, wherein the load balancing switch is capable of ordering the plurality of network addresses based, at least in part, on the round trip time data stored for the multiple host server site switches.

2. The method of claim 1, further comprising;
creating a table, in the load balancing switch, using the round trip time data.

3. The method of claim 2, wherein the table is indexed by network neighborhood.

4. The method of claim 1, further comprising;
sending a health check message to each of the plurality of network addresses from the load balancing switch.

5. The method of claim 4, wherein the health check is a layer 7 health check.

6. The method of claim 5, wherein the layer 7 health check uses a HTTP protocol or a FTP protocol.

7. The method of claim 4, wherein the health check is a layer 4 health check.

8. The method of claim 7, wherein the health check is a TCP or UDP health check.

9. The method of claim 1, wherein
the first client machine is one of a plurality of client machines of the data network; and
the round trip time data for a host server site switch comprises time information for exchanging at least one message between the host server site switch and each client machine from the plurality of client machines with which the host server site switch establishes a connection.

10. The method of claim 1, wherein for a host server site switch from the plurality of host server site switches, the time for exchanging at least one message between the host server site switch and the first client machine is a time difference between the receipt, at the host server site switch, of a connection request message and a connection acknowledgement message from the first client machine.

11. The method of claim 10, wherein the connection request message comprises a TCP SYN packet and the connection acknowledgment message comprises an associated TCP ACK packet.

12. The method of claim 1, wherein the query originated at the first client machine; and wherein the ordering comprises;
generating an ordered list of network addresses from a first network address from the plurality of network addresses to a last network address from the plurality of network addresses, wherein the first network address is associated with a host server site switch from the plurality of host server site switches having a lowest round trip time with the first client machine and the last network address is associated with a host server site switch from the plurality of host server site switches having a highest round trip time with the first client machine.

13. The method of claim 1, wherein the ordering comprises generating an ordered list of network addresses such that a network address from the plurality of network addresses associated with a host server site switch having a higher round trip time is ranked higher in the ordered list than a network address from the plurality of network addresses associated a host server site switch having a lower round trip time.

14. The method of claim 1 further comprising:
determining, based upon the ordering, if the plurality of network addresses comprises a single network address corresponding to a host server site switch with a round trip time data that is less than the round trip time data for any other host server site switch corresponding to a network address in the plurality of network addresses; and
upon determining that the plurality of network addresses does not comprise a single network address, reordering the plurality of network addresses using a criterion that is different than the round trip time data for the multiple host server site switches.

15. A method of load balancing among host servers of a data network, the method comprising;
receiving, at a load balancing switch of the data network, a query regarding a host name;
selecting, from a plurality of network addresses determined responsive to the query, a best network address based, at least in part, on which of the plurality of network addresses has been least recently selected by the load balancing switch as a best network address in response to previous queries; and
storing, at the load balancing switch, round trip time data received from a plurality of host server sites associated with the host servers, wherein the round trip time data received from a host server site comprises a time for exchanging at least one message between the host server site switch client machine from a plurality of client machines.

16. The method of claim 15, wherein the time for exchanging messages between the host server site switch and the client machine is a time difference between the receipt, at the host server site switch, of a connection request message and a connection acknowledgement message from the client machine.

17. The method of claim 15, further comprising:
creating, in the load balancing switch based on the round trip time data, a proximity table.

18. The method of claim 15, further comprising:
creating, in the load balancing switch, a proximity table.

19. A load balancing switch for load balancing amongst a plurality of host servers of a data network, the load balancing switch comprising:
a means for storing round trip time data received from a plurality of host server site switches, the round trip time data received from a host server site switch being a time for exchanging at least one message between the host server site switch and a first client machine from a plurality of client machines of the data network, wherein each host server site switch from the plurality of host server site switches is associated with one or more host servers from the plurality of host servers, the one or more host servers associated with a host server site switch being reachable via the host server site switch;
a means for receiving a query regarding a host name, the query originating at the first client machine of the data network; and
a means for ordering a plurality of network addresses that are responsive to the query based, at least in part, on the stored round trip time data for host server site switches from the plurality of host server site switches whose network addresses are included in the plurality of network addresses.

20. The load balancing switch of claim 19, further comprising:
   a means for ordering the plurality of network addresses based, at least in part, on which of the network addresses in the plurality of network addresses has been least recently selected as a best network address in response to previous queries.

21. The load balancing switch of claim 19, further comprising:
   a means for ordering the plurality of network addresses based, at least in part, on a session capacity associated with host server site switches from the plurality of host server site switches whose network addresses are included in the plurality of network addresses.

22. The load balancing switch of claim 19, further comprising:
   a means for ordering the plurality of network addresses based, at least in part, on an available session capacity associated with host server site switches from the plurality of host server site switches whose network addresses are included in the plurality of network addresses, wherein the available session capacity associated with a host server site switch is a percentage of a session capacity of the host server site switch.

23. The load balancing switch of claim 19, further comprising:
   a means for ordering the plurality of network addresses based, at least in part, on a health of the host servers.

24. The load balancing switch of claim 19 further comprising:
   means for determining, based upon the ordering, if the plurality of network addresses comprises a single network address corresponding to a host server site switch with a round trip time data that is less than the round trip time data for any other host server site switch corresponding to a network address in the plurality of network addresses; and
   upon determining that the plurality of network addresses does not comprise a single network address, means for reordering the plurality of network addresses using a criterion that is different than the round trip time data for the multiple host server site switches.

25. A load balancing switch comprising:
   a database configured to store round trip time data for a plurality of host server site switches, the round trip time data for each host server site switch from the plurality of host server site switches indicating a time for exchanging at least one message between the host server site switch and a client machine, each host server site switch from the plurality of host server site switches being associated with one or more host servers, the one or more host servers associated with a host server site switch being reachable via the host server site switch; and
   a module configured to order a plurality of network addresses, the plurality of network addresses received by the load balancing switch in response to a query originating at the client machine, the plurality network addresses comprising network addresses determined from resolving a host name identified in the query, the plurality of network addresses comprising network addresses of multiple host server site switches from the plurality of host server site switches, wherein the network addresses in the plurality of network addresses are ordered based upon the round trip time data stored in the database for the multiple host server site switches.

26. The load balancing switch of claim 25 wherein a table is created using the round trip time data for the plurality of host server site switches and indexed by network neighborhood.

27. The load balancing switch of claim 25 further comprising a health check module configured to send a health check message to each of the plurality of network addresses.

28. The load balancing switch of claim 27 wherein a health check sent to a network address in the plurality of network addresses is at least one of a layer 7 health check or a layer 4 health check.

29. The load balancing switch of claim 25, wherein the time for exchanging messages between a host server site switch and the client machine is a time difference between the receipt, at the host server site switch, of a connection request message and a connection acknowledgement message from the client machine.

* * * * *

UNITED STATES PATENT AND TRADEMARK OFFICE
CERTIFICATE OF CORRECTION

PATENT NO. : 7,454,500 B1  
APPLICATION NO. : 09/670487  
DATED : November 18, 2008  
INVENTOR(S) : Ivy Pei-Shan Hsu et al.

Page 1 of 4

It is certified that error appears in the above-identified patent and that said Letters Patent is hereby corrected as shown below:

Title Page

In the References Cited (56) section, "U.S. Patent Documents", please insert:

-- 7,082,102    7/2006    Wright --

In the References Cited (56) section, "Other Publications",

Please delete "PCT White Paper," and insert -- PCD White Paper --

Please delete "Norton Networks, "Alteon Personal Content Director," © 2001, can be retrieved from http://www.nortelnetworks.com/personalinternet, 4 pages"

and insert -- Nortel Networks, "Alteon Personal Content Director," © 2001, can be retrieved from http://www.nortelnetworks.com/personalinternet, 4 pages --

In the Drawings, please replace Drawing sheet 3 with the attached replacement one (1) sheet of drawing, showing replacement Figure 3.

In the Background of the Invention section:

At column 1, line 55:
Please delete "from. Japan" and insert -- from Japan --

At column 1, line 56:
Please delete "in. Japan" and insert -- in Japan --

At column 1, line 57:
Please delete "in. New" and insert -- in New --

At column 3, line 3:
Please delete "Foundry. Networks" and insert -- Foundry Networks --

Signed and Sealed this

Fourth Day of May, 2010

David J. Kappos
*Director of the United States Patent and Trademark Office*

At column 3, line 7:
Please delete "a. Universal. Resource. Locator" and insert -- a Universal Resource Locator --

At column 4, line 10:
Please delete "Least. Response" and insert -- Least Response --

At column 4, line 24:
Please delete "Open. System. Interconnection" and insert -- Open System Interconnection --

At column 4, lines 25-26:
Please delete "a. Transmission. Control. Protocol" and insert -- a Transmission Control Protocol --

At column 4, lines 26-27:
Please delete "a. User. Datagram. Protocol" and insert -- a User Datagram Protocol --

At column 4, lines 31-32:
Please delete "TCP. ACK" and insert -- TCP ACK --

At column 4, lines 34-35:
Please delete "well-known. HyperText. Transport. Protocol" and insert -- well-known HyperText Transport Protocol --

At column 4, line 35:
Please delete "File. Transfer. Protocol" and insert -- File Transfer Protocol" --

At column 4, line 53:
Please delete "of. Foundry. Network" and insert -- of Foundry Networks" --

At column 5, line 6:
Please delete "SYN. ACK" and insert -- SYN ACK --

At column 5, line 31:
Please delete "(Asia/Pacific. Rim)" and insert -- (Asia/Pacific Rim) --

At column 5, lines 31-32:
Please delete "(the Americas and. Africa)" and insert -- (the Americas and Africa) --

At column 5, line 40:
Please delete "GSLB. Switch" and insert -- GSLB Switch --

At column 5, line 54:
Please delete "18. A" and insert -- 18A --

At column 6, line 38:
Please delete "a dress.)." and insert -- an IP address.) --

In the Claims:

Claim 15, at column 8, line 31:
Please delete "site switch client machine" and insert -- site switch and a client machine --

FIG. 3

(12) EX PARTE REEXAMINATION CERTIFICATE (9401st)
United States Patent
Hsu et al.

(10) Number: US 7,454,500 C1
(45) Certificate Issued: Nov. 6, 2012

(54) GLOBAL SERVER LOAD BALANCING

(75) Inventors: Ivy Pei-Shan Hsu, Danville, CA (US); David Chun Ying Cheung, San Jose, CA (US); Rajkumar Ramniranjan Jalan, Fremont, CA (US)

(73) Assignee: Brocade Communications Systems, Inc., San Jose, CA (US)

Reexamination Request:
No. 90/011,772, Jun. 27, 2011

Reexamination Certificate for:
Patent No.: 7,454,500
Issued: Nov. 18, 2008
Appl. No.: 09/670,487
Filed: Sep. 26, 2000

Certificate of Correction issued May 4, 2010.

(51) Int. Cl.
*G06F 15/173* (2006.01)
(52) U.S. Cl. ........................ 709/226; 709/203
(58) Field of Classification Search .......... None
See application file for complete search history.

(56) References Cited

To view the complete listing of prior art documents cited during the proceeding for Reexamination Control Number 90/011,772, please refer to the USPTO's public Patent Application Information Retrieval (PAIR) system under the Display References tab.

*Primary Examiner* — Rachna Desai (57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

At the time of issuance and publication of this certificate, the patent remains subject to pending reexamination control number 95/001,806 filed Nov. 4, 2011. The claim content of the patent may be subsequently revised if a reexamination certificate issues from the reexamination proceeding.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 15 and 25 is confirmed.

Claims 2-14, 16-24 and 26-29 were not reexamined.

\* \* \* \* \*

US007454500C2

(12) INTER PARTES REEXAMINATION CERTIFICATE (1256th)
United States Patent
Hsu et al.

(10) Number: US 7,454,500 C2
(45) Certificate Issued: Apr. 4, 2016

(54) GLOBAL SERVER LOAD BALANCING (75) Inventors: Ivy Pei-Shan Hsu, Danville, CA (US); David Chun Ying Cheung, San Jose, CA (US); Rajkumar Ramniranjan Jalan, Fremont, CA (US)

(73) Assignee: BROCADE COMMUNICATIONS SYSTEMS, INC., San Jose, CA (US)

Reexamination Request:
No. 95/001,806, Nov. 4, 2011

Reexamination Certificate for:
Patent No.: 7,454,500
Issued: Nov. 18, 2008
Appl. No.: 09/670,487
Filed: Sep. 26, 2000

Reexamination Certificate C1 7,454,500 issued Nov. 6, 2012

Certificate of Correction issued May 4, 2010

(51) Int. Cl.
*G06F 15/173* (2006.01)
*H04L 29/08* (2006.01)

(52) U.S. Cl.
CPC ........ *H04L 67/1002* (2013.01); *H04L 67/1008* (2013.01); *H04L 67/1021* (2013.01); *H04L 67/1012* (2013.01)

(58) Field of Classification Search
None
See application file for complete search history.

(56) References Cited

To view the complete listing of prior art documents cited during the proceeding for Reexamination Control Number 95/001,806, please refer to the USPTO's public Patent Application Information Retrieval (PAIR) system under the Display References tab.

*Primary Examiner* — Rachna Desai (57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

Attention is directed to the decision of *Brocade Communications Systes, Inc.* v. *A10 Networks, Inc.*, Case No. 5:10-cv-03428-LHK (N.D. Cal. 2011), Final Judgment on Jun. 10, 2013 relating to this patent. This reexamination may not have resolved all questions raised by this decision. See 37 CFR 1.552(c) for *ex parte* reexamination and 37 CFR 1.906(c) for *inter partes* reexamination.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 14, 16, 17, 22 and 24 is confirmed.

Claims 1-13, 15, 18-21, 23 and 25-29 are cancelled.

\* \* \* \* \*